No. 720,241.　　　　　　　　　　　　　　　PATENTED FEB. 10, 1903.
C. L. HAASE, Jr.
MOTOR VEHICLE.
APPLICATION FILED DEC. 8, 1902.
NO MODEL.

Witnesses:　　　　　　　　　　　　　　　　Inventor.
　　　　　　　　　　　　　　　　　　　　　Charles L. Haase Jr.
Alma Klug　　　　　　　　　　　　　　　by Benedict, Morsell & Green
　　　　　　　　　　　　　　　　　　　　　　Attorneys.

THE NORRIS PETERS CO., PHOTO-LITHO., WASHINGTON, D. C.

UNITED STATES PATENT OFFICE.

CHARLES L. HAASE, JR., OF MILWAUKEE, WISCONSIN, ASSIGNOR TO NORTH-WESTERN FURNITURE COMPANY, OF MILWAUKEE, WISCONSIN, A CO-PARTNERSHIP COMPOSED OF CHARLES L. HAASE, RUDOLPH C. HAASE, AND RUDOLPH C. FORRER.

MOTOR-VEHICLE.

SPECIFICATION forming part of Letters Patent No. 720,241, dated February 10, 1903.

Application filed December 8, 1902. Serial No. 134,315. (No model.)

*To all whom it may concern:*

Be it known that I, CHARLES L. HAASE, Jr., residing at Milwaukee, in the county of Milwaukee and State of Wisconsin, have invented a new and useful Improvement in Motor-Vehicles, of which the following is a description, reference being had to the accompanying drawings, which are a part of this specification.

This invention relates to improvements in motor-vehicles, and more particularly to improvements in mechanism for operating the speed-changing or shifting device therefor.

The object of this invention is to produce mechanism for actuating a speed-changing device for motor-vehicles of a peculiar type having a slidable or longitudinally-movable shifting bar.

A further object of this invention is to produce actuating mechanism for the particular speed-changing device illustrated in an application filed by me on May 23, 1902, and having the serial number 108,623.

Figure 1:
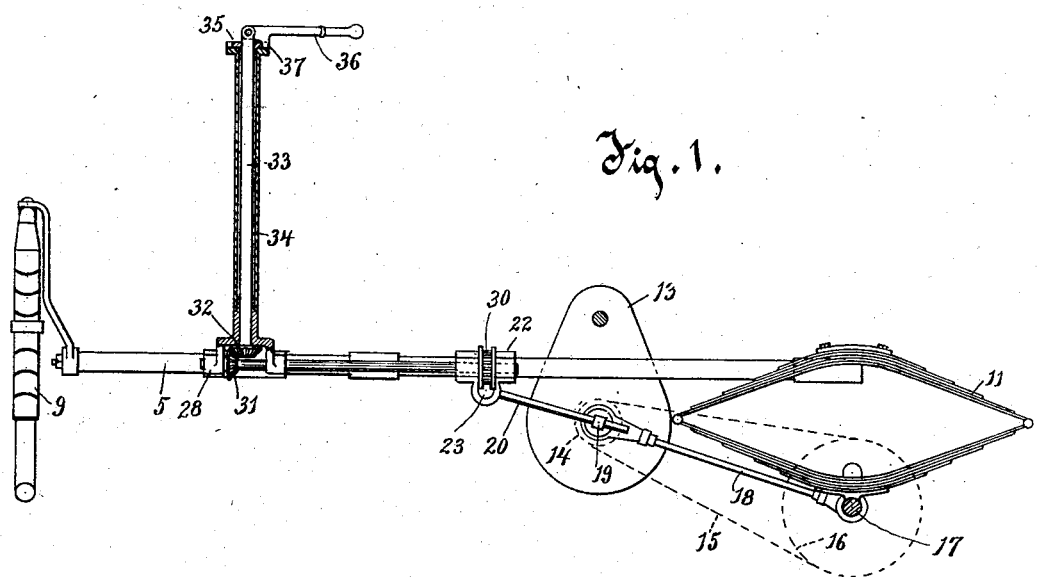
Figure 2:
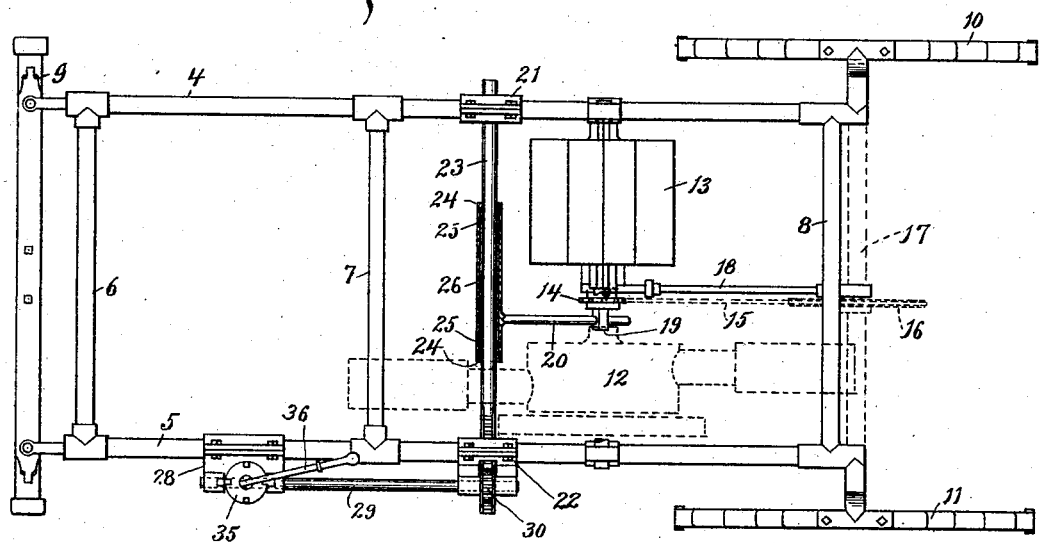
Figure 3:

In the drawings, Figure 1 is a side elevation of portions of the running-gear and body-frame of the vehicle, and this view shows the positions of the several elements embodied in this invention, portions of some of which are shown in section. Fig. 2 is a plan view of a vehicle-body frame, shown attached to the springs. In this view the motor for propelling the vehicle is shown in dotted lines, and this invention is shown in place on the vehicle-body frame. The rear axle of the vehicle is shown in dotted lines, and the power-transmitting chain from the sprocket carried on the rear axle to the sprocket on the speed-changing device is shown in dotted lines. Fig. 3 is a detail view of a portion of this device.

Throughout the several views like elements are denoted by like characters.

For the sake of illustration in this application I have shown a vehicle-body frame comprising side rods 4 and 5, formed in the usual way from steel tubing and joined and braced by cross-rods 6, 7, and 8. The body-frame is adapted to be carried on springs 9, 10, and 11, which will be secured to the running-gear of the vehicle. A motor or engine 12, which in Fig. 2 is illustrated as an explosive-engine of a well-known type, is carried by cross-rods 7 and 8. Pivotally hung on one side to the main shaft of the motor and on the other side to the side rod 4 is the speed-changing device 13 of the type hereinbefore described. The speed-changing device is provided with a chain-sprocket 14, over which a driving-chain 15 after passing around a sprocket-wheel 16, carried on the rear axle 17 of the vehicle, will pass. A distance-rod 18 of the ordinary type extends from the rear axle of the vehicle to and engages the speed-changing device, and as the speed-changing device, with the vehicle-body frame, changes its position vertically of the vehicle the distance-rod will preserve the proper distance between the two sprocket-wheels by swinging the speed-changing device on its pivots.

As is shown in my pending application referred to, the speed-changing device is provided with a longitudinally movable or slidable actuating-bar 19, provided at its outer end with a hole or opening extending therethrough within which a rod 20 is adapted to freely move.

Within suitable boxes 21 22 a rod 23 is journaled and adapted to move longitudinally. Rigidly secured to rod 23 are two stop-collars 24 24, each having an inwardly-projecting reduced portion 25. A sleeve 26, rigidly secured to rod 20, is loosely journaled on the reduced portions of said stop-collars and forced to move longitudinally with rod 23.

It will be seen that as the speed-changing device is rocked on its pivots by means of the distance-rod 18 sleeve 26 will be rocked on rod 23 and the slidable bar 19 of the speed-changing device will move to and fro on rod 20.

One end of rod 23 is provided with a rack 27. Suitably journaled within a bearing carried by box 22 and within a bearing carried by a suitable support 28, secured to side rod 5, is a rotatable rod 29. Rod 29 at one end carries a gear-wheel 30, adapted to mesh and work with rack 27 for sliding rod 23 longitudinally and with it the slidable bar 19 of the speed-changing device. The other end of rod 29 carries a beveled gear 31, adapted to mesh and work with a corresponding gear 32, carried at the lower end of a rotatable upright 33, suitably incased within a tubular housing 34. The tubular housing 34 is topped with a notched cap 35, and the upright 33 is provided at its upper end with an actuating-handle 36, having a depending member 37, adapted to lie within one of the notches of the cap.

The operating-handle 36 is adapted to be within reach of the operator of the vehicle and either at the side or in front of the operator's seat.

What I claim as my invention is—

1. In a motor-vehicle, the combination with a pivotally-supported speed-changing device actuated by a slidable member, of a distance-rod, a movable agent for sliding said slidable member in engagement therewith and freely movable laterally thereof, and means for moving said agent.

2. In a motor-vehicle, the combination with a pivotally-supported speed-changing device actuated by a slidable member, of a distance-rod, a movable agent for sliding said slidable member in engagement therewith and freely movable laterally thereof, means for moving said agent, and means for holding said agent in adjusted positions.

3. In a motor-vehicle, the combination with a pivotally-supported speed-changing device actuated by a slidable member, of a distance-rod, a movable agent for sliding said slidable member comprising a bar movable laterally of the vehicle, a sleeve rotatable on but movable with said bar, and an arm extending from said sleeve for loosely engaging the slidable member, and means for moving said agent.

4. In a motor-vehicle, the combination with a pivotally-supported speed-changing device actuated by a slidable member, of a distance-rod engaging said device, a movable agent for sliding said slidable member comprising a bar movable laterally of the vehicle, a sleeve rotatable on said bar, stops on said bar for preventing longitudinal movement of said sleeve relatively to said bar, an arm extending from said sleeve passing loosely through an opening therefor in the slidable member, a rack on said bar, and a device utilizing a gear meshing with said rack for sliding said bar.

In testimony whereof I affix my signature in presence of two witnesses.

CHARLES L. HAASE, JR.

Witnesses:
ANNA V. FAUST,
JNO. S. GREEN.